United States Patent
Nakase et al.

(10) Patent No.: US 11,649,514 B2
(45) Date of Patent: May 16, 2023

(54) METHOD FOR REMOVING PHOSPHORUS FROM PHOSPHORUS-CONTAINING SUBSTANCE

(71) Applicant: JFE Steel Corporation, Tokyo (JP)

(72) Inventors: Kenji Nakase, Tokyo (JP); Yoshie Nakai, Tokyo (JP); Naoki Kikuchi, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 384 days.

(21) Appl. No.: 16/957,444

(22) PCT Filed: Dec. 12, 2018

(86) PCT No.: PCT/JP2018/045661
§ 371 (c)(1),
(2) Date: Jun. 24, 2020

(87) PCT Pub. No.: WO2019/131128
PCT Pub. Date: Jul. 4, 2019

(65) Prior Publication Data
US 2021/0071274 A1   Mar. 11, 2021

(30) Foreign Application Priority Data

Dec. 26, 2017 (JP) .............................. JP2017-250072

(51) Int. Cl.
*C21C 1/02* (2006.01)
*C21C 7/064* (2006.01)
*C22B 1/02* (2006.01)

(52) U.S. Cl.
CPC ............ *C21C 1/025* (2013.01); *C21C 7/0645* (2013.01); *C22B 1/02* (2013.01)

(58) Field of Classification Search
CPC ..... C21C 1/025; C21C 7/0645; C21C 7/0087; C21C 7/076; C22B 1/02; C22B 1/11; C01B 21/06; C21B 3/06
USPC .......................................................... 75/459
See application file for complete search history.

(56) References Cited

FOREIGN PATENT DOCUMENTS

| CN | 102126811 A | 7/2011 |
|----|----|----|
| JP | 47010451 A | 5/1972 |
| JP | 5483603 A | 7/1979 |
| JP | 5675507 A | 6/1981 |
| JP | 60261501 A | 12/1985 |
| JP | 2000119759 A | 4/2000 |
| RU | 2001123 C1 | 10/1993 |
| RU | 2594997 C1 * | 8/2016 |
| WO | WO-2015149703 A1 * | 10/2015 ......... C01G 49/0036 |

OTHER PUBLICATIONS

NASA, 10 Interesting Things About Air, Sep. 12, 2016 (Year: 2016).*
Partial Pressures, Chembook (2019) (Year: 2019).*
WO-2015149703-A1 Translation (Year: 2015).*
RU-2594997-C1 Translation (Year: 2016).*
International Search Report and Written Opinion for International Application No. PCT/JP2018/045661, dated Mar. 19, 2019, 4 pages.
Sasabe el al. "Direct Dephosphorization from Iron Ore Containing Higher Concentration of Phosphorus", Tetsu-to-Hagane, vol. 100 (2014), No. 2, pp. 325-330. (Abstract Only).
Taiwanese Office Action for Taiwanese Application No. 107146348. dated Jul. 18, 2019, 5 pages.
Korean Office Action for Korean Application No. 10-2020-7011719, dated Jun. 16, 2021 with Concise Statement of Relevance of Office Action, 5 pages.
Chinese Office Action with Search Report for Chinese Application No. 201880074196.5, dated May 6, 2021, 8 pages.
Semin, A.E., et al., Chernaya Metallurgiya, Russia, (1991), No. 1, 3 pages (brief English description).
Japanese Notice of Reasons for Refusal for Japanese Application No. 2019-562951, dated Oct. 6, 2020, with translation, 8 pages.
Australian Examination Report for Australian Application No. 2018394522, dated Jan. 5, 2021, 4 pages.
Extended European Search Report for European Application No. 18 894 911.9, dated Feb. 9, 2021, 6 pages.

* cited by examiner

*Primary Examiner* — Brian D Walck
*Assistant Examiner* — Danielle Carda
(74) *Attorney, Agent, or Firm* — RatnerPrestia

(57) ABSTRACT

Proposed is a method for removing phosphorus from a phosphorus-containing substance which is applicable in an industrial scale so as to effectively reduce phosphorus contained in the phosphorus-containing substance. In this method, the phosphorus-containing substance used as a raw material for metal smelting or metal refining is reacted with a nitrogen-containing gas at a treatment temperature T (° C.) which is lower than a melting temperature ($T_m$) of the substance, so that phosphorus is removed preferably in the form of phosphorus nitride (PN). In this regard, a nitrogen partial pressure and an oxygen partial pressure in the nitrogen-containing gas are preferably controlled, thereby reducing a load of dephosphorization process, for example.

20 Claims, 2 Drawing Sheets

METHOD FOR REMOVING PHOSPHORUS FROM PHOSPHORUS-CONTAINING SUBSTANCE

CROSS REFERENCE TO RELATED APPLICATIONS

This is the U.S. National Phase application of PCT/JP2018/045661, filed Dec. 12, 2018, which claims priority to Japanese Patent Application No. 2017-250072, filed Dec. 26, 2017, the disclosures of these applications being incorporated herein by reference in their entireties for all purposes.

FIELD OF THE INVENTION

This invention relates to a method for removing phosphorus from a phosphorus-containing substance which is effective for improving a quality as a final metal product by preliminarily reducing phosphorus in the phosphorus-containing substance used as a main raw material or an auxiliary raw material in metal smelting or metal refining.

BACKGROUND OF THE INVENTION

Phosphorus (P) is inevitably included in a molten pig iron manufactured in a blast furnace due to the component of a steelmaking raw material such as iron ore and so on. Since phosphorus is a harmful component for steel material, a dephosphorization treatment is usually performed in the course of steelmaking so as to improve material property of a steel product. The dephosphorization treatment is a method for removing phosphorus in a molten pig iron or in a molten steel by oxidizing phosphorus by means of an oxygen source such as oxygen gas or iron oxide thereby to form $P_2O_5$ and then transferring $P_2O_5$ into a slag mainly composed of CaO. Phosphorus in the molten pig iron or molten steel is oxidized by a gas such as oxygen and removed into a slag while iron is also oxidized. Accordingly, even in the case of using no iron oxide as the oxygen source, iron is contained in the slag in the form of iron oxide.

Recently, an attempt has been made to reduce the generation amount of steelmaking slag, from a viewpoint of environmental measure and resource saving including a recycle use. For example, a slag (converter slag) that is generated when performing decarburization refining of a molten pig iron subjected to a preliminary dephosphorization treatment (treatment for preliminarily removing phosphorus in the molten pig iron before decarburization refining of the molten pig iron in the converter) is recycled in a blast furnace via a sintering process of iron ore as a CaO source or iron source for a slag forming agent, or as a CaO source in a preliminary treatment process for molten pig iron.

When performing decarburization refining of molten pig iron to which a preliminary dephosphorization treatment has been performed (hereinafter, sometimes abbreviated as "dephosphorized molten pig iron"), especially dephosphorized molten pig iron to which a preliminary dephosphorization treatment has been performed to a level of the phosphorus concentration of a steel product in a converter, the molten pig iron generates a converter slag barely containing phosphorus. Accordingly, for example, even when such a converter slag is used for recycling in a blast furnace, there is no need to be concerned about an increase in a phosphorus concentration (pickup) in the molten pig iron. Contrary to this, a slag generated in a preliminary dephosphorization treatment or a converter slag (slag having a high phosphorus content) generated when decarburization refining is performed in a converter to a molten pig iron in which a preliminary dephosphorization treatment has not been performed (hereinafter, sometimes abbreviated as "normal molten pig iron") or to a dephosphorized molten pig iron in which a preliminary dephosphorization treatment has been performed but the phosphorus concentration after the dephosphorization treatment is not decreased to a level of the phosphorus concentration of a steel product is used for recycling in the form of oxide in a blast furnace, phosphorus in a converter slag is reduced in a blast furnace. Therefore, there arises a problem that a phosphorus content in a molten pig iron is increased and thus a load of molten pig iron dephosphorization treatment is rather increased.

Moreover, manganese (Mn) is generally added in order to improve the strength of a steel product. For example, in manufacturing a manganese-containing steel, a manganese source added to increase the Mn concentration in the molten steel includes, in addition to manganese ore, ferromanganese having a carbon content of 1.0 to 7.5 mass %, silicon manganese having a carbon content of not more than 2.0 mass %, and metal manganese having a carbon content of not more than 0.01 mass % and so on. In this regard, it is known that the raw material price of the manganese source other than manganese ore increases as the carbon content lowers. Therefore, in order to reduce the manufacture cost, a manganese-containing steel is manufactured by using manganese ore which is inexpensive as the manganese source. However, a large amount of phosphorus is contained in the manganese ore, which is especially inexpensive, causing a problem that the phosphorus concentration in the steel material is increased to deteriorate the quality thereof when the manganese ore is used as the manganese source. Thus, there is, actually, a limitation on the use of manganese ore.

As mentioned above, a large amount of phosphorus is generally contained in the main raw material or auxiliary raw material used in a steel making process. Accordingly, a phosphorus content in a steel product finally obtained may be large depending on the used amount of phosphorus-containing substance. The phosphorus content has an influence on a quality as steel product. Therefore, in order to suppress the phosphorus content in the steel product, it is necessary to use a phosphorus-containing substance such as a main raw material or an auxiliary raw material having a low phosphorus content. However, there is a problem that this method leads to an increase in cost. Therefore, there have been proposed some methods for preliminarily removing phosphorus from the phosphorus-containing substance as the main raw material or the auxiliary raw material for ironmaking.

For example, Patent Literature 1 proposes a method for removing phosphorus in ore by contacting iron ore, titanium-containing iron ore, nickel-containing ore, chromium-containing ore or mixture having these ores as a main component each having a CaO content of not more than 25 mass % and a ratio $CaO/(SiO_2+Al_2O_3)$ of not more than 5, with a gas selected from a group of Ar, He, $N_2$, CO, $H_2$ and hydrocarbon or a mixture gas thereof at a temperature of not lower than 1600° C.

Moreover, Patent Literature 2 proposes a method of separating and collecting phosphorus by the following steps. That is, firstly, phosphate is separated and dissolved by: crushing iron ore having a high phosphorus content to a size of not more than 0.5 mm; adding water to the crushed iron ore to form a pulp having a concentration of about 35 mass %; and reacting the pulp with a solvent of pH: not more than 2.0 obtained by adding $H_2SO_4$ or HCl thereto. Then, non-magnetic $SiO_2$, $Al_2O_3$ and so on are precipitated and separated as slime by gathering a magnetically attracted substance such as magnetite and so on by means of a magnetic separation, while P dissolved into the solution is neutralized in a range of pH: 5.0-10.0 by adding slaked lime or quicklime so as to separate and collect as calcium phosphate.

Further, Patent Literature 3 proposes a method of performing a dephosphorization treatment of iron ore by using Microbial *Aspergillus* SP KSC-1004 strain or Microbial *Fusarium* SP KSC-1005 strain.

Furthermore, Non-Patent Literature 1 reports a study about reduction of iron ore having a high phosphorus content by means of hydrogen-vapor mixture gas in which a water vapor pressure is controlled, and thus proposes a method of performing a dephosphorization treatment directly from iron ore.

Patent Literature

Patent Literature 1: JP-A-S54-83603
Patent Literature 2: JP-A-S60-261501
Patent Literature 3: JP-A-2000-119759

Non-Patent Literature

Non-Patent Literature 1: Tetusu-to-Hagane, Vol. 100 (2014), No. 2, p. 325

SUMMARY OF THE INVENTION

The prior arts mentioned above have problems to be solved as follows. That is, Patent Literature 1 has a problem that the treatment temperature is as high as not lower than 1600° C., requiring a large energy. Moreover, since ore is processed in a molten state, there is also a problem that a vessel is damaged and handling of the high-temperature melt is difficult.

The method disclosed in Patent Literature 2 is a wet treatment using an acid, in which it is necessary to dry the collected magnetically attracted substance for use as a main raw material and also it is necessary to preliminarily crush the iron ore having a high phosphorus content to a size of not more than 0.5 mm, causing a problem that it takes time and incurs cost increase.

The method of Patent Literature 3 is also a wet treatment, causing a problem that it also takes time and incurs cost increase to dry ore after removal of phosphorus, for use as a main raw material.

Non-Patent Literature 1 has a problem that a phosphorus removal ratio in ore is as low as 13% at a maximum. Moreover, although hydrogen is used as a reaction gas, there has been no consideration about an equipment and so on for safely treatment thereof at an industrial scale.

Aspects of the present invention include a method developed to overcome the problems inherent to the prior arts mentioned above. An object according to aspects of the present invention is to propose a method for removing phosphorus from a phosphorus-containing substance which is applicable at an industrial scale, so as to effectively reduce phosphorus contained in the phosphorus-containing substance that is a solid oxide used as a main raw material or an auxiliary raw material in metal smelting or metal refining.

During studies on the problems of the prior arts mentioned above, the inventors have found out that phosphorus can be removed effectively by heating the phosphorus-containing substance at a low temperature and contacting thereof with a nitrogen-containing gas, and thus, aspects of the invention have been developed.

One aspects of the present invention is a method developed based on the aforementioned knowledge. That is, an aspects of the present invention is a method for removing phosphorus from a phosphorus-containing substance which is characterized by reacting a phosphorus-containing substance used as a raw material for metal smelting or metal refining with a nitrogen-containing gas at a treatment temperature T (° C.) lower than the melting temperature ($T_m$) of the substance. Here, the nitrogen-containing gas is a mixture gas of $N_2$ gas and an arbitrary gas type.

The method for removing phosphorus from a phosphorus-containing substance according to aspects of the present invention having the configuration mentioned above also has preferable embodiments as follows:

a. phosphorus nitride (PN) is formed by reacting the phosphorus-containing substance with the nitrogen-containing gas and removed;

b. the reaction of the phosphorus-containing substance with the nitrogen-containing gas is performed under control of a nitrogen partial pressure $P_{N2}$ and an oxygen partial pressure $P_{O2}$ in the nitrogen-containing gas;

c. a nitrogen partial pressure $P_{N2}$ (atm) in the nitrogen-containing gas is controlled to satisfy a condition of the following formula (1);

[Formula 1]

$$0.2 \leq P_{N2} \leq 0.9 \tag{1}$$

d. the treatment temperature T (° C.) is controlled to satisfy a condition of the following formula (2) and the oxygen partial pressure $P_{O2}$ (atm) in the nitrogen-containing gas is controlled to satisfy a condition of the following formula (3);

[Formula 2]

$$750 \leq T \leq 0.95 \times T_m \tag{2},$$

wherein $T_m$ is a melting point (° C.) of the phosphorus-containing substance

[Formula 3]

$$\log P_{O2} \leq -0.000025 \times T^2 + 0.0723 \times T - 60.9 \tag{3}$$

e. the nitrogen-containing gas includes carbon monoxide (CO); and f. the nitrogen-containing gas includes carbon monoxide (CO) and carbon dioxide ($CO_2$), and the oxygen partial pressure $P_{O2}$ is controlled in accordance with a partial pressure ratio $P_{CO}/P_{CO2}$.

The melting point ($T_m$) is a temperature at which a solid sample is transformed into liquid and is preferably determined according to any one of following three methods, which are simple, but it is not limited to these methods.

The first method is that a solid sample is charged into a vessel such as crucible and then continuously observed while heated at a heating rate of 5° C./minute, preferably not more than 1° C./minute, in an electric resistant furnace or the like under an objected gas atmosphere; the temperature at which a gap between particles of the solid sample is vanished and a smooth surface is generated on a surface is determined as the melting point.

The second method is that a measurement is performed by heating at a heating rate of 5° C./minute preferably not more than 1° C./minute under an objected gas atmosphere by means of a differential thermal analysis; a temperature at a minimum point of the endothermic peak is determined as the melting point. Here, in the case that a plurality of endothermic peaks is generated, the method is performed by: stopping the measurement at a temperature at which respective endothermic peaks are generated; observing an appearance of the measurement sample; and determining the lowest temperature at a minimum point of the endothermic peak among temperatures at which a gap between particles of the solid sample is vanished and a smooth surface is generated on a surface, as the melting point.

The third method is that a liquid phase ratio is calculated by inputting a sample component and varying a temperature by means of thermodynamic calculation software of a computer; a temperature at which a liquid phase ratio exceeds 95% is determined as the melting point.

According to aspects of the present invention, a solid such as a main raw material or an auxiliary raw material including phosphorus which is used as a raw material for metal smelting or metal refining, i.e. a phosphorus-containing substance is reacted with a nitrogen-containing gas by heating the substance to a treatment temperature which is lower than the melting temperature (melting point) of the phosphorus-containing substance, whereby it is possible to remove phosphorus in the phosphorus-containing substance as a gas of phosphorus nitride. Therefore, it is possible to increase a used amount of the main raw material or the auxiliary raw material which is inexpensive as the phosphorus-containing substance and to reduce a load of dephosphorization treatment process in the metal smelting process or the metal refining process.

Moreover, according to aspects of the present invention, phosphorus is removed from a by-product such as steelmaking slag, to thereby expand possibilities for reuse of the by-product. Thus, it is possible to reduce the amount of the auxiliary raw material usage in the steelmaking process and suppress the generation amount of the by-product.

Further, according to aspects of the present invention, phosphorus removed by nitriding is oxidized in an exhaust gas to form $P_2O_5$, and thus it becomes possible to collect a dust having high phosphorus concentration. Therefore, there is also an auxiliary effect that effective use as a phosphorus resource becomes possible.

DETAILED DESCRIPTION OF EMBODIMENTS OF THE INVENTION

Figure 1:
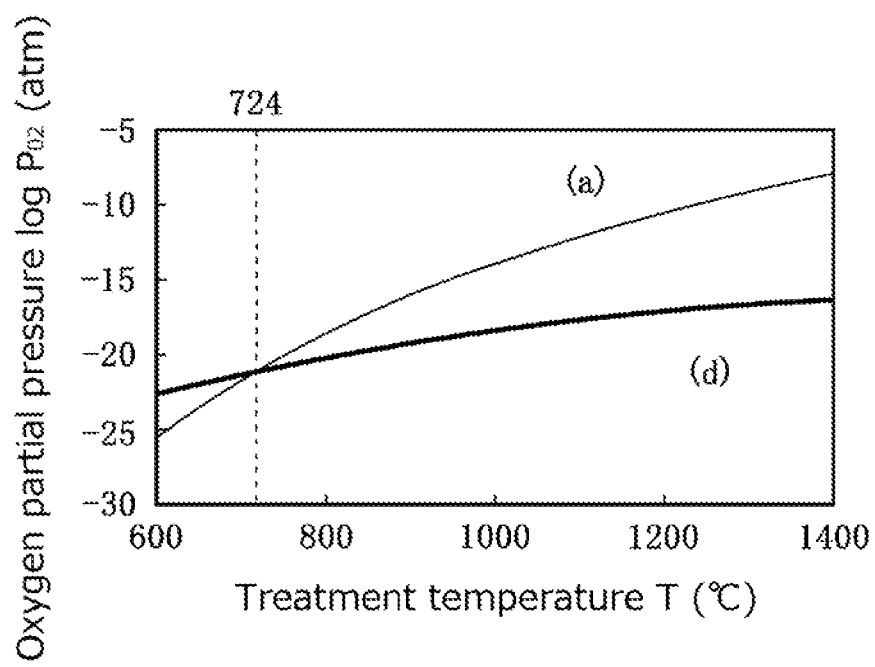
FIG. 1 is a graph showing a relation between a treatment temperature T (° C.) and an oxygen partial pressure (log $P_{O2}$) when both equilibrium reactions of (a): reaction for removing phosphorus as a gas of PN and (d): equilibrium reaction between solid carbon and carbon monoxide gas are satisfied.

In developing aspects of the present invention, the inventors have focused on a substance that is inexpensive and has a high phosphorus concentration as a main raw material and an auxiliary raw material for metal smelting and metal refining, and have studied a method for preliminarily removing phosphorus from such a phosphorus-containing substance.

The phosphorus-containing substance mentioned above used as a raw material (main raw material and auxiliary raw material) for metal smelting and metal refining usually contains phosphorus as an oxide such as $P_2O_5$ mainly and further contains a metal oxide such as CaO, $SiO_2$, MgO, $Al_2O_3$, MnO, $Mn_2O_3$, FeO, $Fe_2O_3$ and so on. The raw material for metal smelting and metal refining, especially raw material for iron- and steel-making includes, for example, iron ore, manganese ore, steelmaking slag and so on, typical components of which are shown in Table 1.

TABLE 1

| | CaO | $SiO_2$ | MgO | $Al_2O_3$ | T•Mn | T•Fe | $P_2O_5$ (mass %) |
|---|---|---|---|---|---|---|---|
| Iron ore | — | 3.5 | — | 1.4 | — | 63 | 0.2 |
| Manganese ore | 0.4 | 4.1 | 0.2 | 8.1 | 50.1 | 0.8 | 0.2 |
| Steelmaking slag | 41 | 13.8 | 6.1 | 5.6 | 1.6 | 18.7 | 1.6 |

As mentioned above, the main raw material and the auxiliary raw material for metal smelting and metal refining (hereinafter, an explanation will be made taking "a raw material for iron- and steel-making" as an example) comprises various metal oxides. Since phosphorus has a weak affinity with oxygen compared to calcium (Ca) and silicon (Si), it is known that $P_2O_5$ in the phosphorus-containing substance is easily reduced in a reduction of the phosphorus-containing substance by carbon, silicon, aluminum and so on. On the other hand, iron is included in various raw materials for iron- and steel-making as an oxide in the form of FeO or $Fe_2O_3$ (hereinafter, abbreviated as "FexO"). Since the affinity of these iron oxides with oxygen is comparable to that of phosphorus, FexO is also reduced when the phosphorus-containing substance is reduced by carbon, silicon, aluminum and so on. In this regard, manganese is included as an oxide in the form of MnO, $Mn_2O_3$ or $MnO_2$ (hereinafter, abbreviated as "MnxO"). Since the oxide of manganese is strong in affinity with oxygen compared to that with phosphorus but weak compared to that with carbon, silicon, aluminum and so on, MnxO is also reduced together with phosphorus when the phosphorus-containing substance is reduced by these substances.

Phosphorus has a high solubility into iron or manganese, and especially, phosphorus formed by reduction is quickly dissolved into iron or manganese that are formed through reduction, thus forming a high phosphorus-containing iron or a high phosphorus-containing manganese. Therefore, the method for removing phosphorus formed by reduction has a problem that a phosphorus removal ratio is low because phosphorus is absorbed and dissolved into iron and manganese which are valuable components.

As a result of diligent research to solve the problem, the inventors have found out that it is possible to perform a treatment under a temperature and oxygen partial pressure at which a metal iron and a metal manganese are not formed by removing phosphorus as a gas of phosphorus nitride (PN), and whereby absorption of phosphorus into iron and manganese can be suppressed.

That is, the inventors have confirmed, by a thermodynamic consideration, that a reaction (a) represented by the following chemical equation 1 that removes phosphorus existing as $P_2O_5$ in the phosphorus-containing gaseous substance of phosphorus nitride (PN) is more stable than reactions (b) and (c) described in the following chemical equations 2 and 3, respectively, in which iron oxide or manganese oxide included in the phosphorus-containing substance are reduced to form a metal iron or a metal manganese, respectively.

[Chemical equation 1]

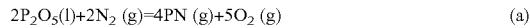
2P$_2$O$_5$(l)+2N$_2$ (g)=4PN (g)+5O$_2$ (g)  (a)

[Chemical equation 2]

2FeO (s)=2Fe (s)+O$_2$(g)  (b)

[Chemical equation 3]

2MnO (s)=2Mn (s)+O$_2$ (g)  (c)

FIG. 1 shows a relation between a temperature and an oxygen partial pressure when equilibrium is established in the reaction (a) represented by the chemical equation 1. Moreover, FIG. 1 also shows a relation between a temperature and an oxygen partial pressure that can be achieved by equilibrium between a solid carbon and a carbon monoxide gas (reaction (d) represented by the chemical equation 4) for comparison. Here, it is assumed that an activity of P$_2$O$_5$ is 0.001; N$_2$ partial pressure is 0.9 atm; PN partial pressure is 0.001 atm; an activity of C is 1; and CO partial pressure is 1 atm.

[Chemical equation 4]

2CO (g)=2C (s)+O$_2$(g)  (d)

In FIG. 1, in a region where a temperature and an oxygen partial pressure are beneath respective lines of the reactions (a) and (d), the reaction progresses to the right side in (a) and (d). That is, in order to achieve a nitriding removal of phosphorus in the reaction (a), it is necessary to control the oxygen partial pressure to not more than $2.2 \times 10^{-19}$ atm at 800° C., not more than $1.45 \times 10^{-14}$ atm at 1000° C. and not more than $4.66 \times 10^{-11}$ atm at 1200° C.

Here, in order to reduce the oxygen partial pressure, it is effective that an element such as a single element of Ca, Mg, Al, Ti, Si, C or the like, which is stable when formed into an oxide, is coexistent. However, the single metallic element is expensive. Accordingly, in accordance with aspects of the present invention, it is preferable to reduce the oxygen partial pressure by using carbon (C), from a viewpoint of reducing the treatment cost. It can be also understood by the fact that, as seen in FIG. 1, the oxygen partial pressure achieved by a solid carbon shows an sufficient value for proceeding the reaction (a) of a nitriding removal of phosphorus at a temperature of not lower than 724° C.

Then, based on the research results mentioned above, an experiment is conducted to examine whether the nitriding removal of phosphorus is performed. In this experiment, 10 g of iron ore controlled to have a particle size of 1 to 3 mm is used as the phosphorus-containing substance, and 5 g of a reagent carbon (particle size of under 0.25 mm) is used as the solid carbon. Then, they are put on different boats made of alumina and kept stably in a small electric resistant furnace. In the furnace, the atmosphere is heated up to a predetermined temperature (600 to 1400° C.) while Ar gas is supplied at 1 liter/min. Thereafter, the supply of Ar gas is stopped, a mixture gas of carbon monoxide (CO) and nitrogen (N$_2$) is supplied at 3 liter/min instead of Ar gas, and it is maintained at a constant temperature for 60 minutes. In this case, the ratio of the mixture gas of carbon monoxide and nitrogen is varied so that a nitrogen partial pressure P$_{N2}$ is changed within a range of 0 to 1 atm. The supply of the mixture gas of carbon monoxide and nitrogen is stopped after a lapse of a predetermined time, and Ar gas is supplied at 1 liter/min instead, and iron ore is collected after the temperature is decreased to a room temperature. In this examination, the reagent carbon reacts with carbon monoxide gas first by supplying the gas in such a manner that the side where the reagent carbon stands is an upstream side.

Figure 2:
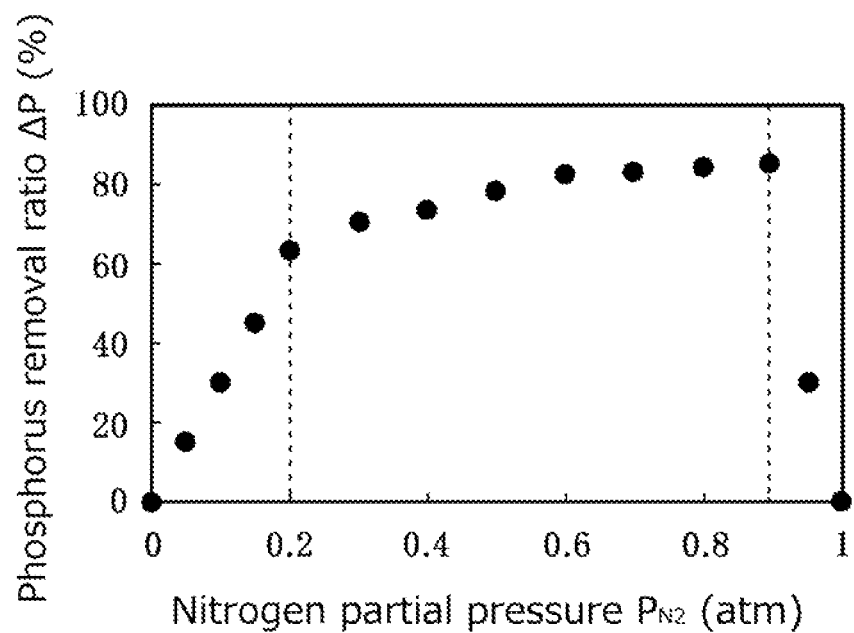
FIG. 2 is a graph showing a relation between a nitrogen partial pressure ($P_{N2}$) and a phosphorus removal ratio (ΔP) of iron ore at a treatment temperature T=1000° C.

FIG. 2 shows a relation between a phosphorus removal ratio ($\Delta$P={(P concentration before examination)−(P concentration after examination)}/(P concentration before examination)) (%) calculated from component analysis results of iron ore before and after the treatment mentioned above is performed at 1000° C. and a nitrogen partial pressure (P$_{N2}$) (atm). As seen from FIG. 2, except in the case a nitrogen partial pressure (P$_{N2}$) is 0 or 1 atm, phosphorus is removed from the phosphorus-containing substance, and a high phosphorus removal ratio of not less than 60% is obtained especially in the range of 0.2 to 0.9 atm. The reason why the phosphorus removal ratio is low at the nitrogen partial pressure of less than 0.2 atm is considered that the nitrogen partial pressure is too low and the phosphorus removal by the reaction (a) does not sufficiently proceed in a predetermined treatment time. It is also considered that the supply amount of CO gas is small when the nitrogen partial pressure exceeds 0.9 atm and the oxygen partial pressure is increased by oxygen formed by the thermal decomposition of iron oxide in iron ore to suppress the reaction (a) of nitriding removal of phosphorus. This is also understood from a fact that phosphorus is not removed by a supply of 100% nitrogen gas (P$_{N2}$=1 atm).

Figure 3:
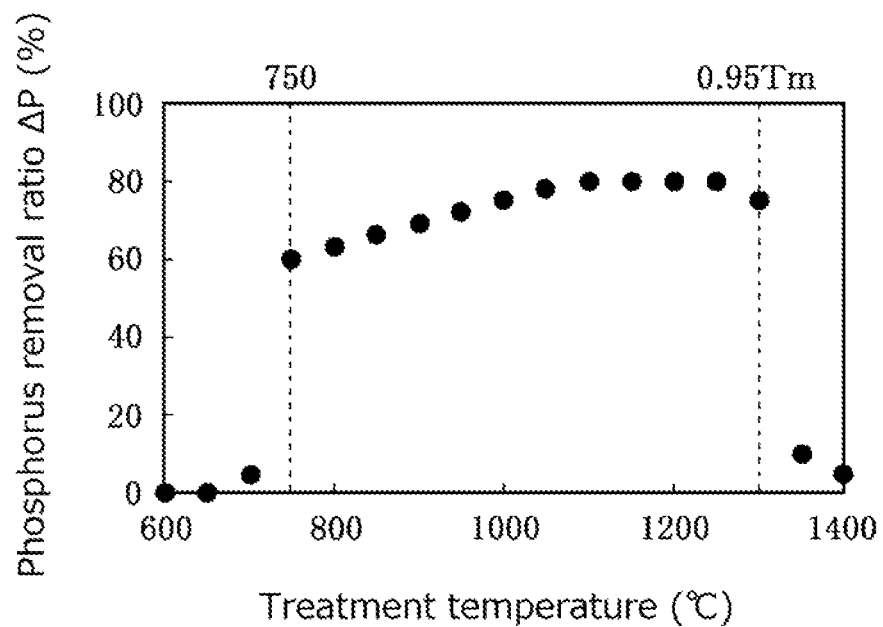
FIG. 3 is a graph showing a relation between a treatment temperature T (° C.) and a phosphorus removal ratio (ΔP) of iron ore at $P_{CO}$=0.1 atm and $P_{N2}$=0.9 atm.

FIG. 3 shows a relation between a phosphorus removal ratio ($\Delta$P %) and a treatment temperature T (° C.), which is obtained from component analysis results of iron ore before and after the experiment in which the treatment is performed by using an mixture gas of CO=10 vol % (P$_{CO}$=0.1 atm) and N$_2$=90 vol % (P$_{N2}$=0.9 atm). As seen from FIG. 3, a high phosphorus removal ratio is obtained in a range of 750 to 1300° C., which is preferable for a nitriding removal of phosphorus. The reason why the phosphorus removal ratio is low at a temperature of lower than 750° C. is considered partly because, as shown in FIG. 1, the oxygen partial pressure necessary for a nitriding removal of phosphorus cannot be achieved by a solid carbon at a temperature of not higher than 724° C. Moreover, at a temperature of 1350° C. and 1400° C., iron ore is in a state from a semi-molten state to a molten state, and collected sample is aggregated. As a result, a gap and a pore between iron ore particles are vanished and an interfacial area contacting with gas is largely reduced. In this regard, the melting point (T$_m$) of iron ore measured by a differential thermal analysis is 1370° C., and a high phosphorus removal ratio is obtained at a temperature of 1300° C. which is 0.95 times thereof. Therefore, it considered preferable that the treatment temperature is not higher than "0.95×T$_m$ (° C.)" in order to maintain a reaction interfacial area for removal of phosphorus.

Experiments are made to manganese ore and steelmaking slag having different particle sizes by using the same method. As a result, it can be seen in all conditions that a high phosphorus removal ratio is obtained when the nitrogen partial pressure (P$_{N2}$) is in the range of "0.2 to 0.9 atm" and the treatment temperature T (° C.) is in the range of "not lower than 750° C. but not higher than 0.95×T$_m$ (° C.)" (here, T$_m$ is a melting point of manganese ore or steelmaking slag).

As explained above, in order to remove phosphorus in the phosphorus-containing substance by nitriding, it is considered necessary to perform the treatment at a predetermined temperature and supply nitrogen at an environment of low oxygen partial pressure. An equipment for performing such a treatment may include an equipment capable of heating and atmosphere control such as electric furnace, rotary hearth furnace, kiln furnace, fluidized bed heating furnace, sintering machine and so on.

Moreover, a method for the reducing oxygen partial pressure may be any of the following methods, as long as the predetermined oxygen partial pressure can be obtained:
(1) a method of contacting a solid reducing agent and a nitrogen gas at a high temperature;
(2) a method of mixing a reducing gas such as carbon monoxide, hydrogen, hydrocarbon and so on with a nitrogen gas; and
(3) a method of removing oxygen by introducing a nitrogen gas into a solid electrolyte to which a voltage is applied.

Then, iron ore is charged into a rotary hearth furnace having a scale of 5 ton/hr and subjected to a nitriding treatment, in which the treatment temperature, oxygen partial pressure and nitrogen partial pressure are controlled by adjusting amounts of fuel and oxygen which are supplied into a heating burner, a ratio thereof, and an amount of nitrogen gas supplied. An operation condition of this equipment is set such that a time from charging to discharging is 30 minutes, and a temperature measurement and a gas component analysis are performed where a charged sample is located after a treatment is performed for 15 minutes. The concentration of carbon monoxide (CO) (vol %) and the concentration of carbon dioxide ($CO_2$) (vol %) in the gas are measured by an infrared gas analyzer, and the residue is treated as a concentration of nitrogen (vol %). Moreover, the oxygen partial pressure $P_{O2}$ is calculated from the measurement value of the $P_{CO}/P_{CO2}$ ratio based on the following equation 4, wherein $\Delta G°$ is a standard free energy change of formation; T is a reaction temperature (K); K is an equilibrium constant (-); R is a gas constant (cal/(mol·K)); $P_{CO}$ is a partial pressure of carbon monoxide (atm); $P_{CO2}$ is a partial pressure of carbon dioxide (atm); and $P_{O2}$ is a partial pressure of oxygen (atm).

[Equation 4]

$$2CO_2(g) = 2CO(g) + O_2(g) \quad (4)$$
$$\Delta G° = 134{,}300 - 40.74 \times T (\text{cal/mol})$$
$$K = \exp\left(-\frac{\Delta G°}{RT}\right) = \left(\frac{P_{CO}}{P_{CO_2}}\right)^2 \cdot P_{O_2}$$

Tables 2 to 6 show the treatment conditions and examination results with respect to respective nitrogen partial pressures $P_{N2}$. Nitrogen partial pressures $P_{N2}$ of Tables 2, 3, 4, 5, and 6 are 0.2, 0.5, 0.9, 0.15 and 0.95 atm, respectively.

TABLE 2

($P_{N2}$: 0.2 atm)

| | Temperature °C. | Gas composition | | | | Oxygen partial pressure | | | Appearance |
| | | CO vol % | $CO_2$ vol % | $N_2$ vol % | $\frac{P_{CO}}{P_{CO2}}$ | $P_{O2}$ atm | $\log P_{O2}$ atm | ΔP % | after treatment |
|---|---|---|---|---|---|---|---|---|---|
| Invention Example 1 | 750 | 53.15 | 26.85 | 20 | 1.98 | 4.15E−21 | −20.38 | 60 | Granular |
| Invention Example 2 | 750 | 72.84 | 7.16 | 20 | 10.17 | 1.57E−22 | −21.80 | 60 | Granular |
| Invention Example 3 | 800 | 53.42 | 26.58 | 20 | 2.01 | 8.76E−20 | −19.06 | 62 | Granular |
| Invention Example 4 | 800 | 72.79 | 7.21 | 20 | 10.10 | 3.47E−21 | −20.46 | 62 | Granular |
| Invention Example 5 | 1000 | 39.80 | 40.20 | 20 | 0.99 | 7.16E−15 | −14.15 | 70 | Granular |
| Invention Example 6 | 1000 | 72.83 | 7.17 | 20 | 10.16 | 6.82E−17 | −16.17 | 70 | Granular |
| Invention Example 7 | 1200 | 26.31 | 53.69 | 20 | 0.49 | 3.95E−11 | −10.40 | 71 | Granular |
| Invention Example 8 | 1200 | 66.55 | 13.45 | 20 | 4.95 | 3.87E−13 | −12.41 | 71 | Granular |
| Invention Example 9 | 1300 | 27.02 | 52.98 | 20 | 0.51 | 6.74E−10 | −9.17 | 67 | Granular |
| Invention Example 10 | 1300 | 66.46 | 13.54 | 20 | 4.91 | 7.27E−12 | −11.14 | 67 | Granular |
| Comparative Example 1 | 700 | 26.67 | 53.33 | 20 | 0.50 | 2.18E−21 | −20.66 | 0 | Granular |
| Comparative Example 2 | 700 | 53.42 | 26.58 | 20 | 2.01 | 1.35E−22 | −21.87 | 3 | Granular |
| Comparative Example 3 | 700 | 72.75 | 7.25 | 20 | 10.03 | 5.42E−24 | −23.27 | 3 | Granular |
| Comparative Example 4 | 750 | 26.67 | 53.33 | 20 | 0.50 | 6.51E−20 | −19.19 | 1 | Granular |
| Comparative Example 5 | 800 | 27.02 | 52.98 | 20 | 0.51 | 1.36E−18 | −17.87 | 1 | Granular |
| Comparative Example 6 | 1000 | 3.81 | 76.19 | 20 | 0.05 | 2.81E−12 | −11.55 | 1 | Granular |
| Comparative Example 7 | 1200 | 3.81 | 76.19 | 20 | 0.05 | 3.80E−09 | −8.42 | 1 | Granular |
| Comparative Example 8 | 1300 | 3.81 | 76.19 | 20 | 0.05 | 7.02E−08 | −7.15 | 1 | Granular |

TABLE 2-continued ($P_{N2}$: 0.2 atm)

| | Temperature °C. | Gas composition | | | | Oxygen partial pressure | | | Appearance |
| | | CO vol % | $CO_2$ vol % | $N_2$ vol % | $\frac{P_{CO}}{P_{CO2}}$ | $P_{O2}$ atm | $logP_{O2}$ atm | ΔP % | after treatment |
| --- | --- | --- | --- | --- | --- | --- | --- | --- | --- |
| Comparative Example 9 | 1400 | 3.81 | 76.19 | 20 | 0.05 | 9.15E−07 | −6.04 | 1 | Melt |
| Comparative Example 10 | 1400 | 26.67 | 53.33 | 20 | 0.50 | 9.15E−09 | −8.04 | 1 | Melt |
| Comparative Example 11 | 1400 | 66.73 | 13.27 | 20 | 5.03 | 9.04E−11 | −10.04 | 1 | Melt |

TABLE 3

($P_{N2}$: 0.5 atm)

| | Temperature °C. | Gas composition | | | | Oxygen partial pressure | | | Appearance |
| | | CO vol % | $CO_2$ vol % | $N_2$ vol % | $\frac{P_{CO}}{P_{CO2}}$ | $P_{O2}$ atm | $logP_{O2}$ atm | ΔP % | after treatment |
| --- | --- | --- | --- | --- | --- | --- | --- | --- | --- |
| Invention Example 11 | 750 | 33.50 | 16.50 | 50 | 2.03 | 3.95E−21 | −20.40 | 67 | Granular |
| Invention Example 12 | 750 | 45.50 | 4.50 | 50 | 10.11 | 1.59E−22 | −21.80 | 67 | Granular |
| Invention Example 13 | 800 | 33.44 | 16.56 | 50 | 2.02 | 8.67E−20 | −19.06 | 69 | Granular |
| Invention Example 14 | 800 | 45.53 | 4.47 | 50 | 10.19 | 3.41E−21 | −20.47 | 69 | Granular |
| Invention Example 15 | 1000 | 25.25 | 24.75 | 50 | 1.02 | 6.75E−15 | −14.17 | 78 | Granular |
| Invention Example 16 | 1000 | 45.52 | 4.48 | 50 | 10.16 | 6.79E−17 | −16.17 | 78 | Granular |
| Invention Example 17 | 1200 | 16.89 | 33.11 | 50 | 0.51 | 3.65E−11 | −10.44 | 79 | Granular |
| Invention Example 18 | 1200 | 41.67 | 8.33 | 50 | 5.00 | 3.80E−13 | −12.42 | 79 | Granular |
| Invention Example 19 | 1300 | 16.67 | 33.33 | 50 | 0.50 | 7.02E−10 | −9.15 | 72 | Granular |
| Invention Example 20 | 1300 | 41.60 | 8.40 | 50 | 4.95 | 7.16E−12 | −11.15 | 72 | Granular |
| Comparative Example 12 | 700 | 16.44 | 33.56 | 50 | 0.49 | 2.27E−21 | −20.64 | 0 | Granular |
| Comparative Example 13 | 700 | 33.39 | 16.61 | 50 | 2.01 | 1.35E−22 | −21.87 | 4 | Granular |
| Comparative Example 14 | 700 | 45.41 | 4.59 | 50 | 9.89 | 5.57E−24 | −23.25 | 4 | Granular |
| Comparative Example 15 | 750 | 16.44 | 33.56 | 50 | 0.49 | 6.78E−20 | −19.17 | 1 | Granular |
| Comparative Example 16 | 800 | 16.67 | 33.33 | 50 | 0.50 | 1.41E−18 | −17.85 | 1 | Granular |
| Comparative Example 17 | 1000 | 2.38 | 47.62 | 50 | 0.05 | 2.81E−12 | −11.55 | 1 | Granular |
| Comparative Example 18 | 1200 | 2.38 | 47.62 | 50 | 0.05 | 3.80E−09 | −8.42 | 1 | Granular |
| Comparative Example 19 | 1300 | 2.38 | 47.62 | 50 | 0.05 | 7.02E−08 | −7.15 | 1 | Granular |
| Comparative Example 20 | 1400 | 2.38 | 47.62 | 50 | 0.05 | 9.15E−07 | −6.04 | 0 | Melt |
| Comparative Example 21 | 1400 | 16.67 | 33.33 | 50 | 0.50 | 9.15E−09 | −8.04 | 3 | Melt |
| Comparative Example 22 | 1400 | 41.69 | 8.31 | 50 | 5.02 | 9.08E−11 | −10.04 | 3 | Melt |

TABLE 4

($P_{N2}$: 0.9 atm)

| | Temperature °C. | Gas composition | | | | Oxygen partial pressure | | | Appearance |
| --- | --- | --- | --- | --- | --- | --- | --- | --- | --- |
| | | CO vol % | $CO_2$ vol % | $N_2$ vol % | $\frac{P_{CO}}{P_{CO2}}$ | $P_{O2}$ atm | $\log P_{O2}$ atm | ΔP % | after treatment |
| Invention Example 21 | 750 | 6.69 | 3.31 | 90 | 2.02 | 3.99E−21 | −20.40 | 70 | Granular |
| Invention Example 22 | 750 | 9.08 | 0.92 | 90 | 9.83 | 1.68E−22 | −21.77 | 70 | Granular |
| Invention Example 23 | 800 | 6.70 | 3.30 | 90 | 2.03 | 8.58E−20 | −19.07 | 73 | Granular |
| Invention Example 24 | 800 | 9.10 | 0.90 | 90 | 10.13 | 3.45E−21 | −20.46 | 73 | Granular |
| Invention Example 25 | 1000 | 5.02 | 4.98 | 90 | 1.01 | 6.88E−15 | −14.16 | 81 | Granular |
| Invention Example 26 | 1000 | 9.08 | 0.92 | 90 | 9.90 | 7.16E−17 | −16.15 | 81 | Granular |
| Invention Example 27 | 1200 | 3.33 | 6.67 | 90 | 0.50 | 3.80E−11 | −10.42 | 82 | Granular |
| Invention Example 28 | 1200 | 8.32 | 1.68 | 90 | 4.96 | 3.86E−13 | −12.41 | 82 | Granular |
| Invention Example 29 | 1300 | 3.29 | 6.71 | 90 | 0.49 | 7.30E−10 | −9.14 | 75 | Granular |
| Invention Example 30 | 1300 | 8.33 | 1.67 | 90 | 4.98 | 7.07E−12 | −11.15 | 75 | Granular |
| Comparative Example 23 | 700 | 3.38 | 6.62 | 90 | 0.51 | 2.10E−21 | −20.68 | 0 | Granular |
| Comparative Example 24 | 700 | 6.71 | 3.29 | 90 | 2.04 | 1.31E−22 | −21.88 | 5 | Granular |
| Comparative Example 25 | 700 | 9.08 | 0.92 | 90 | 9.85 | 5.63E−24 | −23.25 | 5 | Granular |
| Comparative Example 26 | 750 | 3.33 | 6.67 | 90 | 0.50 | 6.51E−20 | −19.19 | 1 | Granular |
| Comparative Example 27 | 800 | 3.33 | 6.67 | 90 | 0.50 | 1.41E−18 | −17.85 | 1 | Granular |
| Comparative Example 28 | 1000 | 0.48 | 9.52 | 90 | 0.05 | 2.81E−12 | −11.55 | 1 | Granular |
| Comparative Example 29 | 1200 | 0.48 | 9.52 | 90 | 0.05 | 3.80E−09 | −8.42 | 1 | Granular |
| Comparative Example 30 | 1300 | 0.48 | 9.52 | 90 | 0.05 | 7.02E−08 | −7.15 | 1 | Granular |
| Comparative Example 31 | 1400 | 0.48 | 9.52 | 90 | 0.05 | 9.15E−07 | −6.04 | 0 | Melt |
| Comparative Example 32 | 1400 | 3.33 | 6.67 | 90 | 0.50 | 9.15E−09 | −8.04 | 1 | Melt |
| Comparative Example 33 | 1400 | 8.32 | 1.68 | 90 | 4.94 | 9.37E−11 | −10.03 | 1 | Melt |

TABLE 5

($P_{N2}$: 0.15 atm)

| | Temperature °C. | Gas composition | | | | Oxygen partial pressure | | | Appearance |
| --- | --- | --- | --- | --- | --- | --- | --- | --- | --- |
| | | CO vol % | $CO_2$ vol % | $N_2$ vol % | $\frac{P_{CO}}{P_{CO2}}$ | $P_{O2}$ atm | $\log P_{O2}$ atm | ΔP % | after treatment |
| Comparative Example 34 | 700 | 27.95 | 57.05 | 15 | 0.49 | 2.27E−21 | −20.64 | 1 | Granular |
| Comparative Example 35 | 700 | 56.67 | 28.33 | 15 | 2.00 | 1.37E−22 | −21.86 | 1 | Granular |
| Comparative Example 36 | 700 | 77.28 | 7.72 | 15 | 10.01 | 5.45E−24 | −23.26 | 1 | Granular |
| Comparative Example 37 | 750 | 28.33 | 56.67 | 15 | 0.50 | 6.51E−20 | −19.19 | 20 | Granular |
| Comparative Example 38 | 750 | 56.85 | 28.15 | 15 | 2.02 | 3.99E−21 | −20.40 | 20 | Granular |
| Comparative Example 39 | 750 | 77.27 | 7.73 | 15 | 9.99 | 1.63E−22 | −21.79 | 20 | Granular |
| Comparative Example 40 | 800 | 28.33 | 56.67 | 15 | 0.50 | 1.41E−18 | −17.85 | 22 | Granular |
| Comparative Example 41 | 800 | 56.57 | 28.43 | 15 | 1.99 | 8.93E−20 | −19.05 | 22 | Granular |

TABLE 5-continued ($P_{N2}$: 0.15 atm)

| | Temperature °C. | Gas composition | | | | Oxygen partial pressure | | | Appearance |
| | | CO vol % | $CO_2$ vol % | $N_2$ vol % | $\frac{P_{CO}}{P_{CO2}}$ | $P_{O2}$ atm | $\log P_{O2}$ atm | ΔP % | after treatment |
|---|---|---|---|---|---|---|---|---|---|
| Comparative Example 42 | 800 | 77.17 | 7.83 | 15 | 9.86 | 3.64E−21 | −20.44 | 22 | Granular |
| Comparative Example 43 | 1000 | 4.05 | 80.95 | 15 | 0.05 | 2.81E−12 | −11.55 | 30 | Granular |
| Comparative Example 44 | 1000 | 42.29 | 42.71 | 15 | 0.99 | 7.16E−15 | −14.15 | 30 | Granular |
| Comparative Example 45 | 1000 | 77.24 | 7.76 | 15 | 9.95 | 7.09E−17 | −16.15 | 30 | Granular |
| Comparative Example 46 | 1200 | 4.05 | 80.95 | 15 | 0.05 | 3.80E−09 | −8.42 | 30 | Granular |
| Comparative Example 47 | 1200 | 28.33 | 56.67 | 15 | 0.50 | 3.80E−11 | −10.42 | 30 | Granular |
| Comparative Example 48 | 1200 | 70.67 | 14.33 | 15 | 4.93 | 3.90E−13 | −12.41 | 30 | Granular |
| Comparative Example 49 | 1300 | 4.05 | 80.95 | 15 | 0.05 | 7.02E−08 | −7.15 | 28 | Granular |
| Comparative Example 50 | 1300 | 27.95 | 57.05 | 15 | 0.49 | 7.30E−10 | −9.14 | 28 | Granular |
| Comparative Example 51 | 1300 | 70.95 | 14.05 | 15 | 5.05 | 6.88E−12 | −11.16 | 28 | Granular |
| Comparative Example 52 | 1400 | 4.05 | 80.95 | 15 | 0.05 | 9.15E−07 | −6.04 | 1 | Melt |
| Comparative Example 53 | 1400 | 28.33 | 56.67 | 15 | 0.50 | 9.15E−09 | −8.04 | 1 | Melt |
| Comparative Example 54 | 1400 | 71.00 | 14.00 | 15 | 5.07 | 8.90E−11 | −10.05 | 1 | Melt |

TABLE 6

($P_{N2}$: 0.95 atm)

| | Temperature °C. | Gas composition | | | | Oxygen partial pressure | | | Appearance |
| | | CO vol % | $CO_2$ vol % | $N_2$ vol % | $\frac{P_{CO}}{P_{CO2}}$ | $P_{O2}$ atm | $\log P_{O2}$ atm | ΔP % | after treatment |
|---|---|---|---|---|---|---|---|---|---|
| Comparative Example 55 | 700 | 0.01 | 4.99 | 95 | 0.00 | 1.36E−16 | −15.87 | 0 | Granular |
| Comparative Example 56 | 700 | 0.01 | 4.99 | 95 | 0.00 | 1.36E−16 | −15.87 | 0 | Granular |
| Comparative Example 57 | 700 | 0.01 | 4.99 | 95 | 0.00 | 1.36E−16 | −15.87 | 0 | Granular |
| Comparative Example 58 | 750 | 0.01 | 4.99 | 95 | 0.00 | 4.05E−15 | −14.39 | 0 | Granular |
| Comparative Example 59 | 750 | 0.01 | 4.99 | 95 | 0.00 | 4.05E−15 | −14.39 | 0 | Granular |
| Comparative Example 60 | 750 | 0.01 | 4.99 | 95 | 0.00 | 4.05E−15 | −14.39 | 0 | Granular |
| Comparative Example 61 | 800 | 0.01 | 4.99 | 95 | 0.00 | 8.81E−14 | −13.06 | 0 | Granular |
| Comparative Example 62 | 800 | 0.01 | 4.99 | 95 | 0.00 | 8.81E−14 | −13.06 | 0 | Granular |
| Comparative Example 63 | 800 | 0.01 | 4.99 | 95 | 0.00 | 8.81E−14 | −13.06 | 0 | Granular |
| Comparative Example 64 | 1000 | 0.01 | 4.99 | 95 | 0.00 | 1.75E−09 | −8.76 | 0 | Granular |
| Comparative Example 65 | 1000 | 0.01 | 4.99 | 95 | 0.00 | 1.75E−09 | −8.76 | 0 | Granular |
| Comparative Example 66 | 1000 | 0.01 | 4.99 | 95 | 0.00 | 1.75E−09 | −8.76 | 0 | Granular |
| Comparative Example 67 | 1200 | 0.01 | 4.99 | 95 | 0.00 | 2.36E−06 | −5.63 | 0 | Granular |
| Comparative Example 68 | 1200 | 0.01 | 4.99 | 95 | 0.00 | 2.36E−06 | −5.63 | 0 | Granular |
| Comparative Example 69 | 1200 | 0.01 | 4.99 | 95 | 0.00 | 2.36E−06 | −5.63 | 0 | Granular |
| Comparative Example 70 | 1300 | 0.01 | 4.99 | 95 | 0.00 | 4.37E−05 | −4.36 | 0 | Granular |

TABLE 6-continued

| | | Gas composition | | | $\frac{P_{CO}}{P_{CO2}}$ | Oxygen partial pressure | | ($P_{N2}$: 0.95 atm) | Appearance |
| | Temperature °C. | CO vol % | CO$_2$ vol % | N$_2$ vol % | | $P_{O2}$ atm | log$P_{O2}$ atm | ΔP % | after treatment |
|---|---|---|---|---|---|---|---|---|---|
| Comparative Example 71 | 1300 | 0.01 | 4.99 | 95 | 0.00 | 4.37E−05 | −4.36 | 0 | Granular |
| Comparative Example 72 | 1300 | 0.01 | 4.99 | 95 | 0.00 | 4.37E−05 | −4.36 | 0 | Granular |
| Comparative Example 73 | 1400 | 0.01 | 4.99 | 95 | 0.00 | 5.70E−04 | −3.24 | 0 | Melt |
| Comparative Example 74 | 1400 | 0.01 | 4.99 | 95 | 0.00 | 5.70E−04 | −3.24 | 0 | Melt |
| Comparative Example 75 | 1400 | 0.01 | 4.99 | 95 | 0.00 | 5.70E−04 | −3.24 | 0 | Melt |

As apparent especially from Table 5 among the Tables, the phosphorus removal ratio is 30% at a maximum when the nitrogen partial pressure $P_{N2}$ is 0.15 atm. That is, it is considered because the supply of nitrogen in an atmosphere gas is insufficient when the nitrogen partial pressure $P_{N2}$ is 0.15 atm and the nitriding reaction (a) of phosphorus proceeds slowly and phosphorus is not sufficiently removed within 30 minutes which is a treatment time in this case.

Moreover, as apparent from Table 6, a phosphorus removal is not confirmed at all when the nitrogen partial pressure $P_{N2}$ is 0.95 atm. The reason thereof is considered as follows. Since the amount of the CO gas in the atmosphere is insufficient, oxygen formed by the thermal decomposition of iron ore and oxygen included in an involving air from a charging inlet for iron ore or a gap in the equipment are not completely removed. As a result, it is not possible to reduce to the oxygen partial pressure $P_{O2}$ which is necessary for nitriding removal. It coincides with the fact that CO gas is barely detected in a gas analysis.

On the other hand, in Invention Examples 1 to 30 which are conformity with the method according to aspects of the present invention described in Tables 2 to 4, the phosphorus removal ratio is as high as not less than 60%. From this fact, it can be seen that the nitrogen partial pressure $P_{N2}$ (atm) satisfies not less than 0.2 but not more than 0.9 as a preferable condition so as to obtain a high phosphorus removal ratio.

Figure 4:
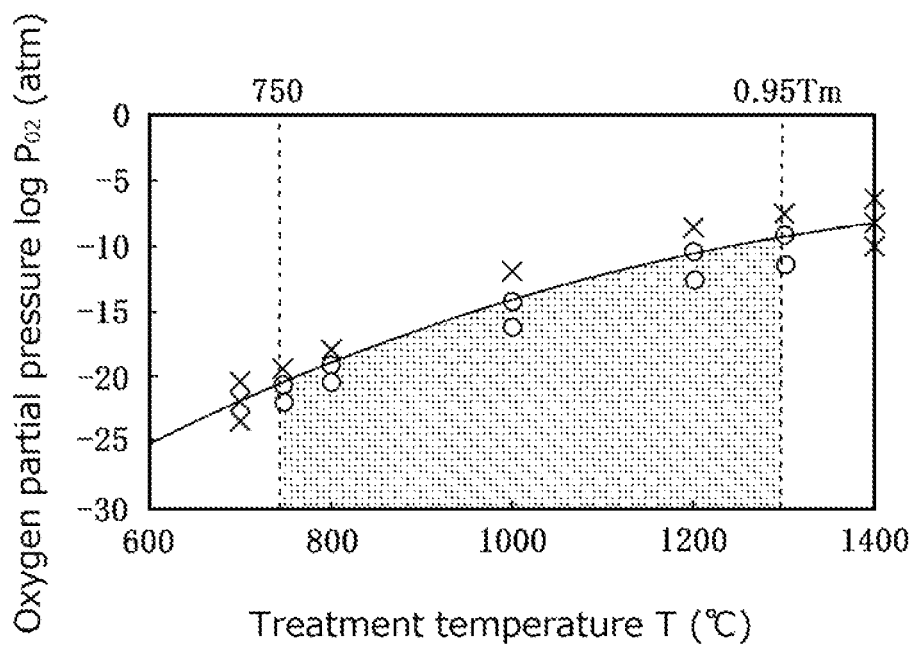
FIG. 4 is a graph showing an influence of a treatment temperature T (° C.) and an oxygen partial pressure (log $P_{O2}$) upon a phosphorus removal ratio shown in Table 2.

FIG. 4 is a graph showing a relation between a treatment temperature T and an oxygen partial pressure $P_{O2}$ indicated in Table 2. Here, results that a phosphorus removal ratio is not less than 60% (invention examples 1 to 10) are plotted by ○, and results that a phosphorus removal ratio is less than 10% (comparative examples 1 to 11) are plotted by X.

As apparent from FIG. 4, a high phosphorus removal ratio is obtained when the following equations (2) and (3) are satisfied. Here, T is a treatment temperature (° C.) and $T_m$ is a melting point of the sample (iron ore: 1370° C.).

[Equation 2]

$$750 \leq T \leq 0.95 \times T_m \quad (2)$$

[Equation 3]

$$\log P_{O2} \leq -0.000025 \times T^2 + 0.0723 \times T - 60.9 \quad (3)$$

The reason why the phosphorus removal ratio is low when equations 2 and 3 are not satisfied is considered as follows. In Comparative Examples 1 to 3, the treatment is performed at a temperature of not higher than 700° C., and thus the low oxygen partial pressure necessary for removal of phosphorus by nitriding is not achieved by the oxygen partial pressure determined from CO—CO$_2$ equilibrium. Moreover, in Comparative Examples 9 to 11, the treatment is performed at a temperature of 1400° C., which is not lower than a melting point of 1370° C. of iron ore as the sample, so that it is considered that the sample is melted and an inside pore and a gap between particles are vanished, resulting in large reduction of the interfacial area. In Comparative Examples 4 to 8, the temperature range represented by equation 1 is satisfied while the oxygen partial pressure does not satisfy equation 2, so that the low oxygen partial pressure necessary for removal of phosphorus by nitriding is not achieved.

As a result of performing the same evaluation with respect to Invention Examples 11 to 30 and Comparative Examples 12 to 33 described in Tables 3 and 4, the same results as that of the above are obtained. Therefore, it is understood that a high phosphorus removal ratio of not less than 60% can be obtained when the conditions in equations 2 and 3 are satisfied.

Even in the case that the treatment time is changed while the same equipment is used, it is confirmed that a high phosphorus removal ratio is obtained when a treatment temperature T, a nitrogen partial pressure $P_{N2}$ and an oxygen partial pressure $P_{O2}$ satisfy the above conditions.

INDUSTRIAL APPLICABILITY

According to the technique disclosed in accordance with aspects of the present invention, it is possible to recycle the removed phosphorus nitride (PN) of an exhaust gas into phosphate fertilizer and so on such as a dust including $P_2O_5$ or the like.

The invention claimed is:

1. A method for removing phosphorus from a phosphorus-containing substance,
    characterized in that the phosphorus-containing substance used as a raw material for metal smelting or metal refining is reacted with a nitrogen-containing gas having an oxygen partial pressure $P_{O2}$ of less than air at a treatment temperature T(° C.) which is lower than a melting temperature ($T_m$) of the phosphorus-containing substance.
2. The method for removing phosphorus from a phosphorus-containing substance according to claim 1,
    wherein phosphorus nitride (PN) is formed by a reaction of the phosphorus-containing substance with the nitrogen-containing gas and removed.

3. The method for removing phosphorus from a phosphorus-containing substance according to claim 2,
wherein the reaction of the phosphorus-containing substance with the nitrogen-containing gas is performed under control of a nitrogen partial pressure $P_{N2}$ and the oxygen partial pressure $P_{O2}$ in the nitrogen-containing gas.

4. The method for removing phosphorus from a phosphorus-containing substance according to claim 3,
wherein the nitrogen partial pressure $P_{N2}$ (atm) in the nitrogen-containing gas is controlled to satisfy a condition represented by the following formula (1);
[Formula 1]

$$0.2 \leq P_{N2} \leq 0.9 \quad (1).$$

5. The method of removing phosphorus from a phosphorus-containing substance according to claim 4,
wherein the treatment temperature T (° C.) is controlled to satisfy a condition of the following formula (2) and the oxygen partial pressure $P_{O2}$ (atm) in the nitrogen-containing gas is controlled to satisfy a condition of the following formula (3);

$$750 \leq T \leq 0.95 \times T_m \quad (2)$$

[Formula 2]
wherein $T_m$ is a melting point (° C.) of the phosphorus-containing substance;
[Formula 3]

$$\log P_{O2} \leq -0.000025 \times T^2 + 0.0723 \times T - 60.9 \quad (3).$$

6. The method for removing phosphorus from a phosphorus-containing substance according to claim 5,
wherein the nitrogen-containing gas includes carbon monoxide (CO).

7. The method for removing phosphorus from a phosphorus-containing substance according to claim 6,
wherein the nitrogen-containing gas includes carbon monoxide (CO) and carbon dioxide ($CO_2$) and the oxygen partial pressure Poe is controlled by a partial pressure ratio $P_{CO}/P_{CO2}$.

8. The method for removing phosphorus from a phosphorus-containing substance according to claim 4,
wherein the nitrogen-containing gas includes carbon monoxide (CO).

9. The method for removing phosphorus from a phosphorus-containing substance according to claim 4,
wherein the nitrogen-containing gas includes carbon monoxide (CO) and carbon dioxide ($CO_2$) and the oxygen partial pressure Poe is controlled by a partial pressure ratio $P_{CO}/P_{CO2}$.

10. The method of removing phosphorus from a phosphorus-containing substance according to claim 3,
wherein the treatment temperature T (° C.) is controlled to satisfy a condition of the following formula (2) and the oxygen partial pressure $P_{O2}$ (atm) in the nitrogen-containing gas is controlled to satisfy a condition of the following formula (3);

$$750 \leq T \leq 0.95 \times T_m \quad (2)$$

[Formula 2]
wherein $T_m$ is a melting point (° C.) of the phosphorus-containing substance;
[Formula 3]

$$\log P_{O2} \leq -0.000025 \times T^2 + 0.0723 \times T - 60.9 \quad (3).$$

11. The method for removing phosphorus from a phosphorus-containing substance according to claim 10,
wherein the nitrogen-containing gas includes carbon monoxide (CO).

12. The method for removing phosphorus from a phosphorus-containing substance according to claim 5,
wherein the nitrogen-containing gas includes carbon monoxide (CO) and carbon dioxide ($CO_2$) and the oxygen partial pressure Poe is controlled by a partial pressure ratio $P_{CO}/P_{CO2}$.

13. The method for removing phosphorus from a phosphorus-containing substance according to claim 3,
wherein the nitrogen-containing gas includes carbon monoxide (CO) and carbon dioxide ($CO_2$) and the oxygen partial pressure Poe is controlled by a partial pressure ratio $P_{CO}/P_{CO2}$.

14. The method for removing phosphorus from a phosphorus-containing substance according to claim 3,
wherein the nitrogen partial pressure $P_{N2}$ (atm) in the nitrogen-containing gas is controlled to satisfy a condition represented by the following formula (1);
[Formula 1]

$$0.2 \leq P_{N2} \leq 0.9 \quad (1).$$

15. The method for removing phosphorus from a phosphorus-containing substance according to claim 14,
wherein the nitrogen-containing gas includes carbon monoxide (CO).

16. The method of removing phosphorus from a phosphorus-containing substance according to claim 3,
wherein the treatment temperature T (° C.) is controlled to satisfy a condition of the following formula (2) and the oxygen partial pressure $P_{O2}$ (atm) in the nitrogen-containing gas is controlled to satisfy a condition of the following formula (3);

$$750 \leq T \leq 0.95 \times T_m \quad (2)$$

[Formula 2] wherein $T_m$ is a melting point (° C.) of the phosphorus-containing substance;
[Formula 3]

$$\log P_{O2} \leq -0.000025 \times T^2 + 0.0723 \times T - 60.9 \quad (3).$$

17. The method for removing phosphorus from a phosphorus-containing substance according to claim 16,
wherein the nitrogen-containing gas includes carbon monoxide (CO).

18. The method for removing phosphorus from a phosphorus-containing substance according to claim 3,
wherein the nitrogen-containing gas includes carbon monoxide (CO).

19. The method for removing phosphorus from a phosphorus-containing substance according to claim 3,
wherein the nitrogen-containing gas includes carbon monoxide (CO) and carbon dioxide ($CO_2$) and the oxygen partial pressure $P_{O2}$ is controlled by a partial pressure ratio $P_{CO}/P_{CO2}$.

20. The method for removing phosphorus from a phosphorus-containing substance according to claim 1,
wherein the nitrogen-containing gas includes carbon monoxide (CO).

* * * * *